(12) United States Patent
Lee et al.

(10) Patent No.: US 6,454,347 B2
(45) Date of Patent: Sep. 24, 2002

(54) SPOILER SUNROOF (75) Inventors: Kiman Lee, Clinton Township, MI (US); Kim Jang-Young, Youngchon (KR); Moo Jin Park, Youngchon (KR)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/793,926

(22) Filed: Feb. 27, 2001

Related U.S. Application Data (62) Division of application No. 09/327,087, filed on Jun. 4, 1999, now Pat. No. 6,199,944.

(51) Int. Cl.$^7$ ............................. B60J 7/047; B60J 7/185
(52) U.S. Cl. ................... 296/223; 296/216.03; 296/224
(58) Field of Search ....................... 296/216.02, 216.03, 296/223, 224

(56) References Cited

U.S. PATENT DOCUMENTS

| | | |
|---|---|---|
| 3,789,645 A | 2/1974 | Schmid |
| 3,970,343 A | 7/1976 | Horn |
| 4,142,761 A | 3/1979 | Lutz et al. |
| 4,227,738 A | 10/1980 | Sorenson |
| 4,403,805 A | 9/1983 | Strem, Jr. et al. |
| 4,417,763 A | 11/1983 | Schlapp et al. |
| 4,466,656 A | 8/1984 | Igel |
| 4,475,767 A | 10/1984 | Grimm et al. |
| 4,482,183 A | 11/1984 | Grimm et al. |
| 4,493,507 A | 1/1985 | Nagata et al. |
| 4,624,501 A | 11/1986 | Niwa et al. |
| 4,630,860 A | 12/1986 | Euerst |
| 4,647,104 A * | 3/1987 | Kohlpaintner et al. ...... 296/221 |
| 4,650,243 A | 3/1987 | Hanley et al. |
| 4,650,244 A | 3/1987 | Boots |
| 4,652,045 A | 3/1987 | Hanley et al. |
| 4,659,140 A | 4/1987 | Fuerst et al. |
| 4,664,440 A | 5/1987 | Kano et al. |
| 4,678,228 A | 7/1987 | Boots |
| 4,684,169 A | 8/1987 | Igel et al. |
| 4,688,848 A | 8/1987 | Niwa |
| 4,707,022 A | 11/1987 | Roos et al. |
| 4,715,649 A | 12/1987 | Bores et al. |
| 4,720,138 A | 1/1988 | Schlapp et al. |
| 4,725,092 A | 2/1988 | Reintges et al. |
| 4,732,422 A | 3/1988 | Schlapp et al. |
| 4,733,904 A | 3/1988 | Snyder |
| 4,738,482 A | 4/1988 | Bohm et al. |
| 4,746,165 A | 5/1988 | Fuerst et al. |
| 4,749,225 A | 6/1988 | Fuerst et al. |
| 4,752,099 A | 6/1988 | Roos et al. |
| 4,765,676 A | 8/1988 | Grimm et al. |

(List continued on next page.)

FOREIGN PATENT DOCUMENTS

| | | |
|---|---|---|
| DE | 3343902 A1 | 6/1985 |
| DE | 3504573 A1 | 8/1986 |
| DE | 3523882 A1 | 1/1987 |

(List continued on next page.)

OTHER PUBLICATIONS

Photographs of Zani sunroof (believed to have been offered for sale prior to May 1997).

(List continued on next page.)

*Primary Examiner*—Dennis H. Pedder
(74) *Attorney, Agent, or Firm*—Harness, Dickey & Pierce, P.L.C.

(57) ABSTRACT

The preferred embodiment of a sunroof includes a sunroof panel, a track, an actuating mechanism, and a panel securing member operable to assist in securing a rear section of the panel to the track when the panel is in a closed position. In another aspect of the present invention, a lock assembly includes a spring biased finger and a panel securing member which are movable relative to a track to secure a rear section of a sunroof panel depending on the positional relationship of the finger relative to a camming member.

7 Claims, 8 Drawing Sheets

U.S. PATENT DOCUMENTS

| | | | |
|---|---|---|---|
| 4,779,920 A | 10/1988 | Alfonso | |
| 4,786,102 A | 11/1988 | Sakamoto et al. | |
| 4,801,174 A | 1/1989 | Hirshberg et al. | |
| 4,802,707 A | 2/1989 | Schlapp | |
| 4,811,985 A | 3/1989 | Kruger et al. | |
| 4,813,737 A | 3/1989 | Schlapp | |
| 4,877,285 A | 10/1989 | Huiyer | |
| 4,893,869 A | 1/1990 | Fuerst | |
| 4,895,410 A | 1/1990 | Grimm et al. | |
| 4,927,208 A | 5/1990 | Farmont | |
| 4,971,387 A | 11/1990 | Bohm et al. | |
| 4,974,902 A | 12/1990 | Huyer | |
| 4,978,165 A | * 12/1990 | Schreiter et al. | 296/223 X |
| 4,982,995 A | 1/1991 | Takahashi | |
| 5,020,849 A | * 6/1991 | Schlapp et al. | 296/223 X |
| 5,028,089 A | 7/1991 | Schmidhuber et al. | |
| 5,039,161 A | 8/1991 | Schmidhuber et al. | |
| 5,066,068 A | 11/1991 | Suzuki et al. | |
| 5,069,501 A | 12/1991 | Baldwin et al. | |
| 5,154,482 A | * 10/1992 | Hayashi et al. | 296/223 |
| 5,156,435 A | 10/1992 | Farmont | |
| 5,184,870 A | 2/1993 | Bauhof | |
| 5,234,250 A | 8/1993 | Hattass et al. | |
| 5,288,125 A | 2/1994 | Huyer | |
| 5,299,791 A | 4/1994 | Schlapp | |
| 5,303,974 A | 4/1994 | Schlapp et al. | |
| 5,306,069 A | 4/1994 | Becker et al. | |
| 5,306,070 A | 4/1994 | Schlapp et al. | |
| 5,326,149 A | 7/1994 | Schlapp | |
| 5,409,290 A | 4/1995 | Grimm et al. | |
| 5,464,267 A | 11/1995 | Racine et al. | |
| 5,507,547 A | 4/1996 | Hattass et al. | |
| 5,532,523 A | 7/1996 | Tang | |
| 5,580,123 A | 12/1996 | Ochiai | |
| 5,601,330 A | 2/1997 | Ulbrich et al. | |
| 5,630,641 A | 5/1997 | Mori et al. | |
| 5,632,523 A | 5/1997 | Kelm | |
| 5,738,402 A | 4/1998 | Aydt et al. | |
| 5,746,475 A | 5/1998 | Caye et al. | |
| 5,749,621 A | 5/1998 | Smith | |
| 5,765,908 A | 6/1998 | Kelm | |
| 5,791,728 A | 8/1998 | Hausrath | |
| 5,899,524 A | * 5/1999 | Mori et al. | 296/223 X |

FOREIGN PATENT DOCUMENTS

| | | | |
|---|---|---|---|
| DE | 35 27 541 A1 | 2/1987 | |
| DE | 35321111 A1 | 3/1987 | |
| DE | 3801881 A1 | 8/1988 | |
| DE | 4001759 C1 | 4/1991 | |
| EP | 0 182 431 A1 | 5/1986 | |
| EP | 0 577 097 A1 | 1/1994 | |
| GB | 2 090 630 | 7/1982 | |
| JP | 59-12717 | 1/1984 | |
| JP | 362034814 | * 2/1987 | 296/216.03 |
| JP | 64-22621 | 1/1989 | |
| NL | 42539 | 1/1938 | |
| RU | 66875 | 2/1940 | |

OTHER PUBLICATIONS

Photographs of Webasto aftermarket sunroof (believed to have been offered for sale prior to May 1997).

Photographs of Westmont sunroof (believed to have been offered for sale prior to May 1997).

ASC Incorporated Internet Advertising for 800VSS, 750VSS, 840VSS and 925 VSS sunroof systems (believed to have been published, offered for sale or publicly used prior to Jun. 4, 1999).

* cited by examiner

SPOILER SUNROOF

This application is a divisional application of U.S. patent application Ser. No. 09/327,087, filed on Jun. 4, 1999 now U.S. Pat. No. 6,199,944, which is incorporated herein by reference.

BACKGROUND AND SUMMARY OF THE INVENTION

The present invention generally pertains to sunroofs for use in automotive vehicles and more particularly to spoiler sunroof locking, actuating and sealing systems.

Two basic types of motorized sunroofs are commonly used in automotive vehicles. A first type is a drop down opening version where a generally flat glass or metal sunroof panel is movable from a closed position to a tilted venting position and then to a fully open position disposed beneath a stationary roof of the vehicle. The second type is known as a spoiler sunroof. In most spoiler sunroofs, the sunroof panel is movable from a closed position to a venting position and then to a fully open position with a rear section of the panel being disposed above the fixed roof. Spoiler sunroofs are often used when the stationary roof behind the sunroof is relatively small or where it is desired to maximize occupant head room in the passenger compartment.

Examples of various conventional sunroof actuating mechanisms are disclosed in the following U.S. Pat. Nos.: 5,765,908 entitled "Adjustment Apparatus for a Sunroof" which issued to Kelm on Jun. 16, 1998; U.S. Pat. No. 5,746,475 entitled "Drive Mechanism for an Automotive Vehicle Sunroof Assembly" which issued to Caye et al. on May 5, 1998; U.S. Pat. No. 5,580,123 entitled "Sun-Roof Device" which issued to Ochiai on Dec. 3, 1996; U.S. Pat. No. 5,326,149 entitled "Blocking Device for Sliding-Lifting Roofs for Automobile" which issued to Schlapp on Jul. 5, 1994; U.S. Pat. No. 5,069,501 entitled "Spoiler Sunroof Control Mechanism" which issued to Baldwin et al. on Dec. 3, 1991; and U.S. Pat. No. 4,877,285 entitled "Open Roof Construction for a Vehicle" which issued to Huyer on Oct. 31, 1989.

In accordance with the present invention, a preferred embodiment of a sunroof includes a sunroof panel, a track, an actuating mechanism movably coupling the panel to the track, and a panel securing member operable to assist in securing a rear section of the panel to the track when the panel is in a closed position. In another aspect of the present invention, a lock assembly includes a spring biased finger and a panel securing member which are movable relative to a track to secure a rear section of a sunroof panel depending on the positional relationship of the finger relative to a camming member. A further aspect of the present invention provides an abutment structure projecting from a device movably associated with a sunroof panel or actuating mechanism for abutting against a stationary track to deter inadvertent collapsing of the panel when in a raised position. Still another aspect of the present invention employs a lever having a lifting pivot coupled to a sunroof panel assembly, a fulcrum movably coupled to a stationary track, and a camming pin interfacing with a movable camming surface. In yet another aspect of the present invention, a bulbous seal has a pair of spaced apart and generally parallel legs mounted to a sunroof housing.

The sunroof of the present invention is advantageous over traditional constructions in that the lock assembly of the present invention couples movement of a front camming mechanism to engagement and disengagement of the panel securing member which operably secures the rear section of the sunroof panel in its closed position. The mechanical movements of the present invention lock assembly provide very reliable, smooth and low effort operational forces due, in part, to transverse spring biasing of a finger relative to the remainder of the lock assembly while also employing linear fore and aft spring biasing of the lock assembly relative to the stationary track; geometrically complicated cams are unnecessary to achieve the desired lock assembly finger-to-actuating mechanism interface. Furthermore, the preferred shape and materials of the preferred embodiment finger of the present invention provide inherent lubricity and low effort disengagement between lead in angles of the finger and the actuating mechanism.

The specific lever and camming arrangement of the present invention actuating mechanism enhance stability and strength of the spoiler sunroof, while minimizing packaging space and cost, especially as compared to many conventional constructions. The specific geometric positioning of the fulcrum, lift pivot and camming pin of the present invention lever achieve a well balanced, powerful and compact mechanism to tilt the sunroof panel. This is further enhanced by the general prevention of vertical movement of the fulcrum relative to the track. Additionally, the abutment structure serves as a failsafe way of deterring undesired collapsing of the venting or open sunroof panel. This supplemental device is especially useful in preventing contact of the sunroof panel against the stationary roof when the vehicle is traveling at high speeds or when a person pushes against the panel when open. Moreover, the present invention seal is advantageous by promoting generally vertical bulb compression when the sunroof panel is moved from an open or venting position, to a closed position. This vertical sealing movement serves to minimize the necessary closing forces of the sunroof panel relative to the track and housing, which also reduces required power of the motor. Additional advantages and features of the present invention will become apparent from the following description and appended claims, taken in conjunction with the accompanying drawings.

BRIEF DESCRIPTION OF THE DRAWINGS

FIG. 3 is a fragmentary and exploded side elevational view showing the preferred embodiment spoiler sunroof;

FIG. 4 is a side elevational view showing the preferred embodiment spoiler sunroof disposed in a fully closed position;

DETAILED DESCRIPTION OF THE PREFERRED EMBODIMENT

Sunroof panel assembly 23 includes a generally horizontal (when closed) and planar glass panel 41, a bracket 43, a catch 45 and a metal reinforcement 47. Bracket 43 and catch 45 are glued onto a bottom surface of panel 41. Bracket 43 has a bifurcated front end 48 and a threaded fastener for disengagably attaching to reinforcement 47. Bifurcated end 48 captures an edge 49 of an opening in reinforcement 47. Once assembled, reinforcement 47, bracket 43 and panel 41 always move in unison.

Actuating mechanism 27 includes a cam block 51 and a lift lever 53. A flocked and wire wound cable 55 pushes and pulls cam block 51 within a groove 58 of track 29. SUFLEX brand cable which can be purchased from Suhner Manufacturing, Inc. of Rome, Ga., has been found suitable. Cable 55 is operably driven by energization of a fractional horsepower, direct current electric motor (not shown) mounted to a front edge of reinforcing pan 43. Cam block 51 has a slotted, S-shape camming surface 57. Camming surface 57 increases in height adjacent a rear edge of cam block 51. A metal, circular-cylindrical block pin 59 laterally projects in a crosscar manner from a lateral face of cam block 51. Block pin 59 movably rides within a slotted camming surface 61 projecting in a longitudinally fore and aft direction of a downturned flange of reinforcement 47. A bushing 63 is provided as part of block pin 59. Feet 65 of cam block 51 ride within groove 58 and the main body of cam block 51 vertically projects through an elongated upper opening of track 29. A depressed pocket or aperture 67 is disposed in a lateral face of cam block 51 opposite slotted camming surface 57.

Lifting lever 53 has a lifting pivot segment 81 which is fastened to a rear segment of reinforcement 47 by way of a pair of bushings 83 and a pivot pin 85. Pivot pin 85 is secured in holes of reinforcement 47 by use of a lock ring 87. Lever 53 further has a central fulcrum pin 89 pivotably journalled between a pair of bushing shoes 91. Shoes 91 are operable to move in a fore and aft direction inside groove 58 of track 29. However, the fulcrum pin is essentially prevented from vertically moving relative to track 29. Furthermore, a camming extension pin 93 of lever 53 rides along camming surface 57 of cam block 51. Thus, fore and aft movement of cam block 51 causes vertical lifting or lowering of camming pin 93 along camming surface 57. This further causes rotation of lever 53 about fulcrum pin 89 which, in turn, serves to vertically lift and tilt reinforcement 47 and panel 41. The relationship of lifting pivot segment 81, camming pin 93 and fulcrum pin 89 form a triangular shape thereby compactly balancing and maximizing mechanical forces required to lift and lower sunroof panel assembly 23. Cam block 51 and lever 53 are both preferably injection molded from glass-filled Nylon 616. Track 29 and reinforcement 47 are preferably made from aluminum.

An L-shaped camming slot 101 is stationarily mounted in track 29. A main pivot pin 103 laterally projecting from downturned flange of reinforcement 47 for movably riding within camming slot 101. This allows vertical initial and final movement of reinforcement 47 and panel 41 relative to track 29 and a weatherstrip seal 105. A cam stop 107 is also mounted to track 29.

Figure 2:
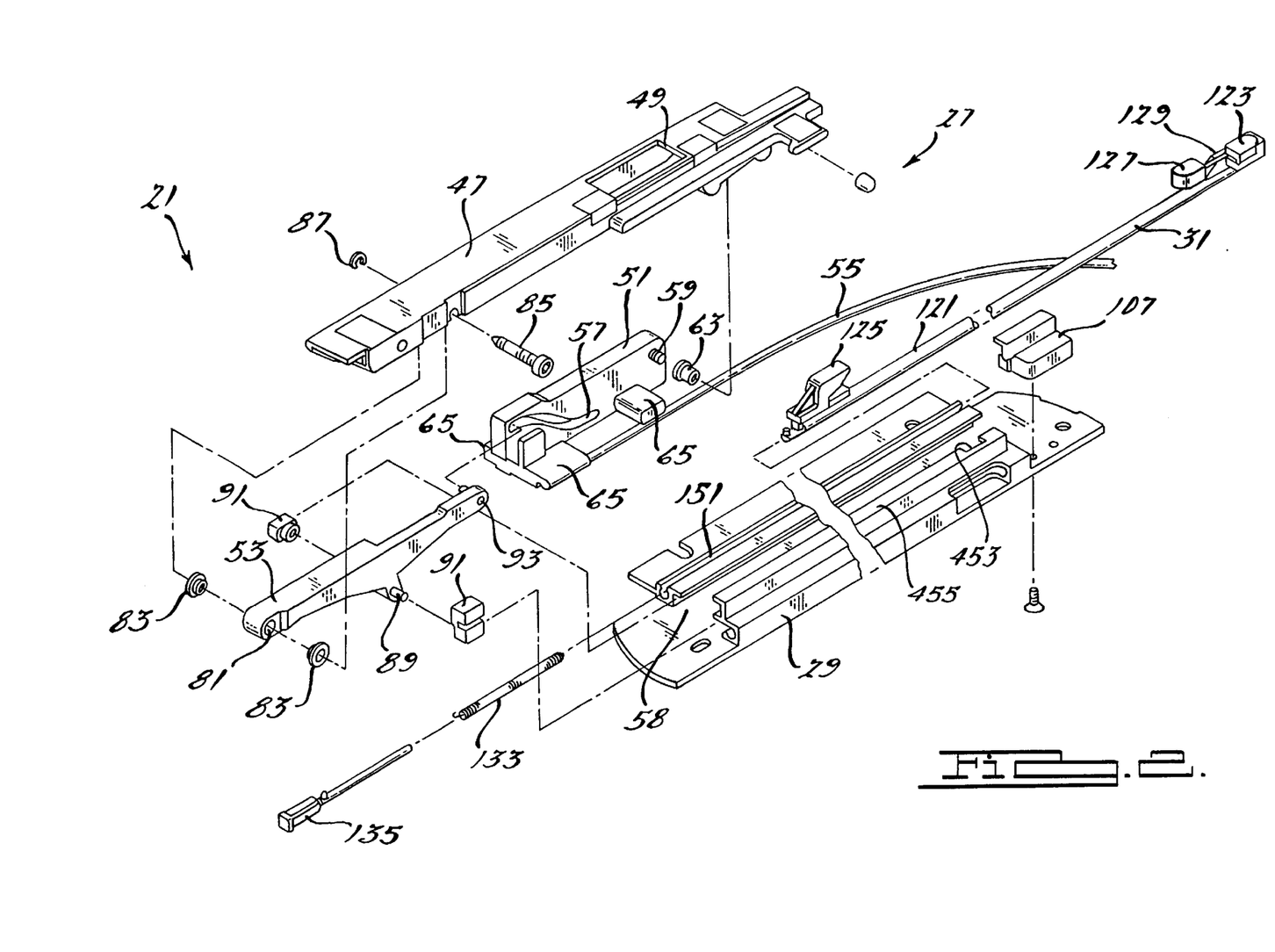
FIG. 2 is an exploded perspective view showing the preferred embodiment spoiler sunroof.
Figure 9:
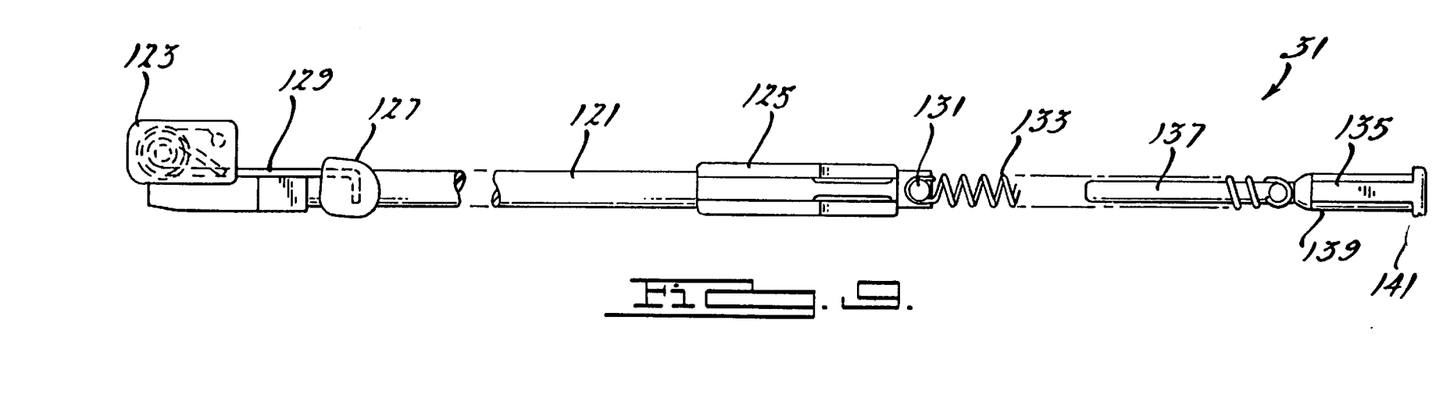
FIG. 9 is a top elevational view showing a lock assembly of the preferred embodiment spoiler sunroof.
Figure 10:
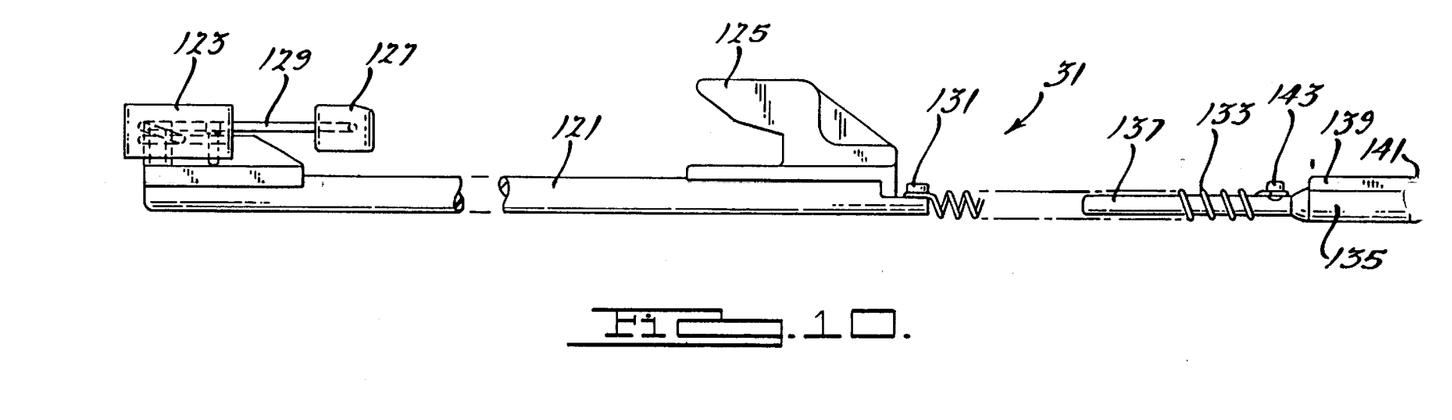
FIG. 10 is a side elevational view showing the lock assembly of the preferred embodiment spoiler sunroof.

As can best be observed in FIGS. 2, 9 and 10, lock assembly 31 has a circular-cylindrical shaft 121, an enlarged two-part head 123 and a panel assembly securing hook 125. A finger 127 is mounted to head 123 by way of a music wire, torsion spring 129. Torsion spring 129 has a coil and a first end disposed inside of head 123. An opposite L-shaped end is injection molded within finger 127. An outer periphery (as viewed from the top, like FIG. 9) of finger 127 has a predominantly curved shape. A nib 131 upwardly extends from a trailing end of lock assembly 31 for engagement by a hook of a music wire extension spring 133. A spring stop 135 has an elongated circular-cylindrical shank 137, a keyhole shaped body 139 and an enlarged head 141. Another hook of extension spring 133 engages a nib 143 upwardly extending from shank 137. Shaft 121 of lock assembly 31, extension spring 133, shank 137, and body 139 are all disposed in another channel or groove 151 of track 29. Spring stop 135 is inserted into an end of groove 151 but head 141 prevents complete insertion. Lock assembly 31 is allowed to move in a fore and aft manner within groove 151 and is biased toward spring stop 135 by extension spring 133. Finger 127 and hook 125 project above track 29. Lock assembly 31 and springs top 135 are preferably injection molded from glass-filled Nylon 6/6.

Figure 1:
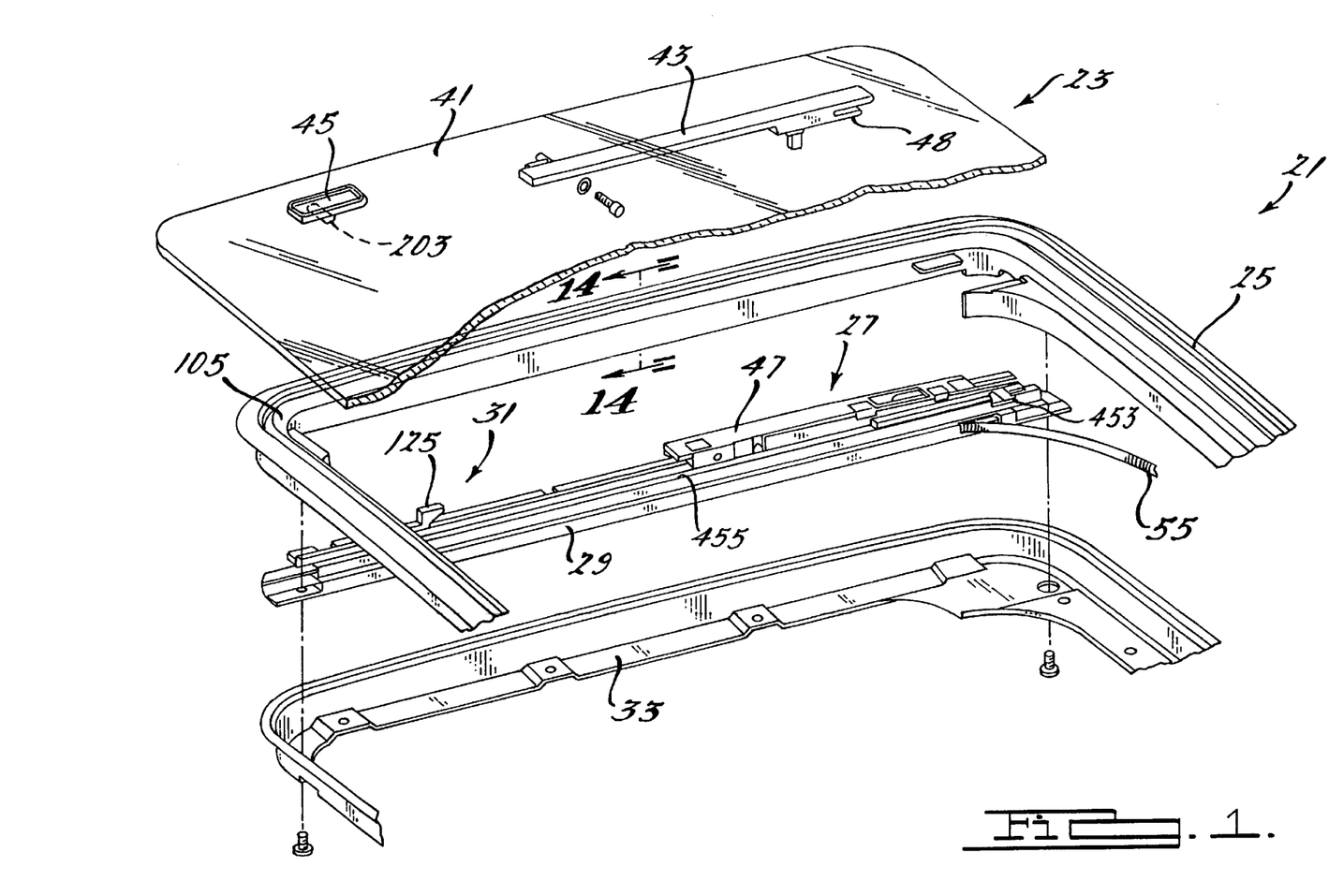
FIG. 1 is a fragmentary and partially exploded perspective view showing the preferred embodiment of a spoiler sunroof of the present invention.
Figure 7:
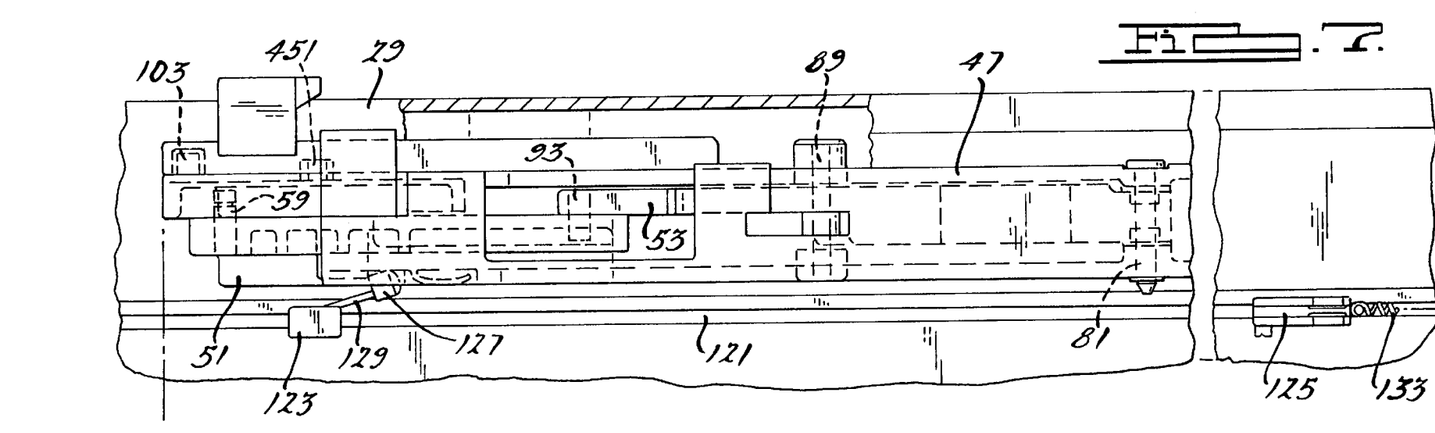
FIG. 7 is a top elevational view showing the preferred embodiment spoiler sunroof disposed in the closed but unlocked position.
Figure 15:
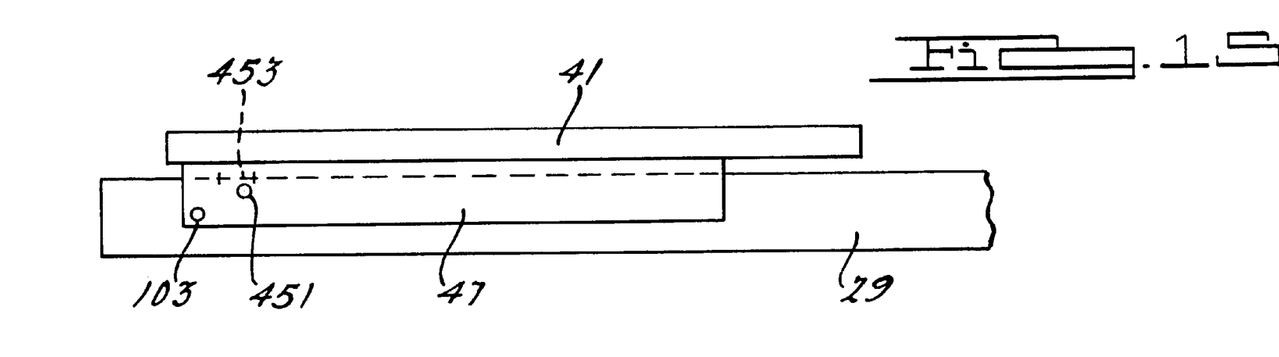
FIGS. 15 and 16 are diagrammatic side views showing the pin movement for the preferred embodiment spoiler sunroof in lowered and fully opened positions, respectively.
Figure 16:
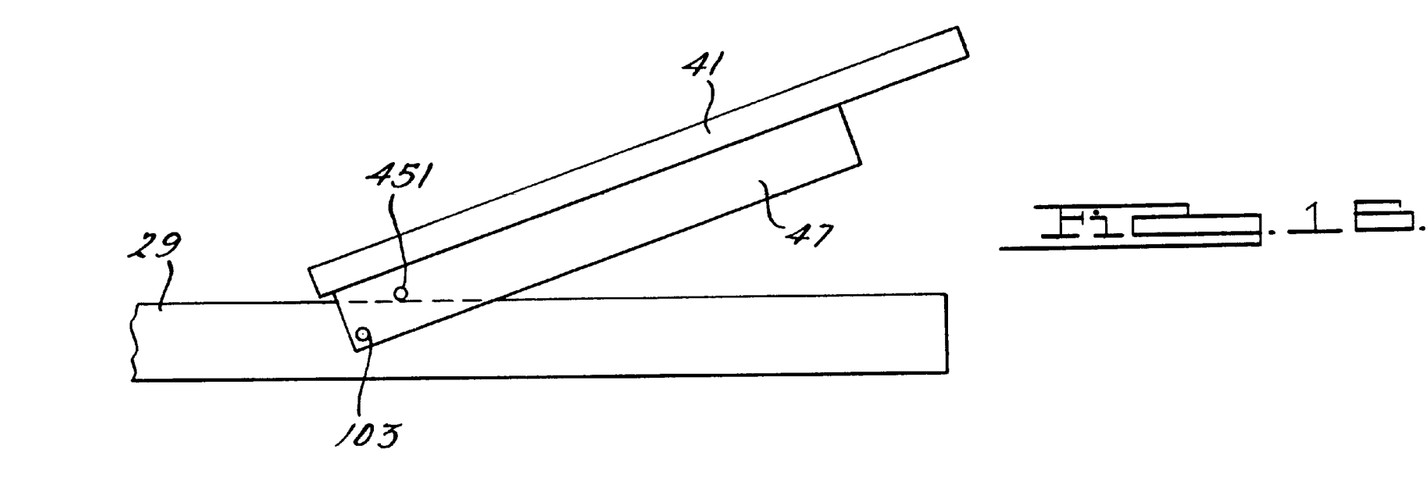

Referring to FIGS. 1, 2, and 7, an abutment structure 451 projects from a device movably associated with sunroof panel 41 or actuating mechanism 27 for abutting against stationary track 29 to deter inadvertent collapsing of panel 41 when in a raised position. The abutment structure serves as a failsafe way of deterring undesired collapsing of the venting or open sunroof panel. This supplemental device is especially useful in preventing contact of the sunroof panel against the stationary roof when the vehicle is traveling at high speeds or when a person pushes against the panel when open. More specifically, abutment structure 451 projects in a crosscar manner and moving with reinforcement 47. Abutment structure 451 is vertically movable through a slot 453 in track 29 when reinforcement 47 is moved from a closed position to a venting position; the abutment structure is then movable in a fore and aft direction directly above a wall 455 of track 29 when reinforcement 47 is moved in the fore and aft direction, thereby deterring inadvertent collapsing of the reinforcement toward the track when the abutment structure is rearward of the slot of the track. This is shown best in FIGS. 7, 15 and 16.

Figure 5:
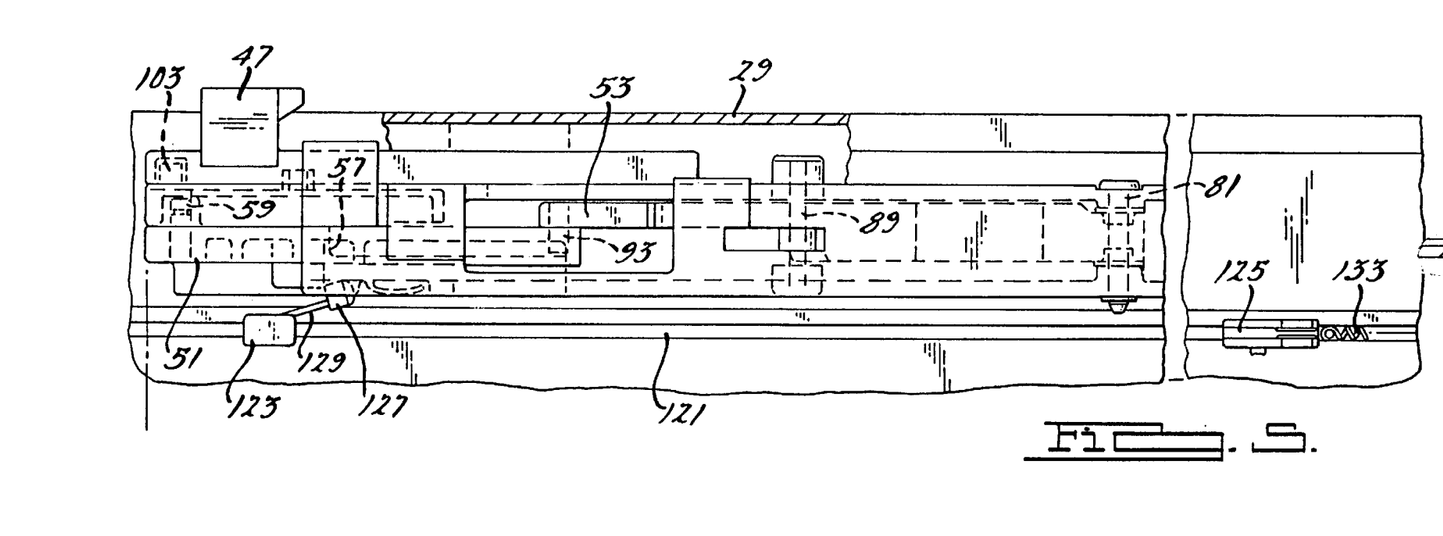
FIG. 5 is a top elevational view showing the preferred embodiment spoiler sunroof in the fully closed position.
Figure 11:
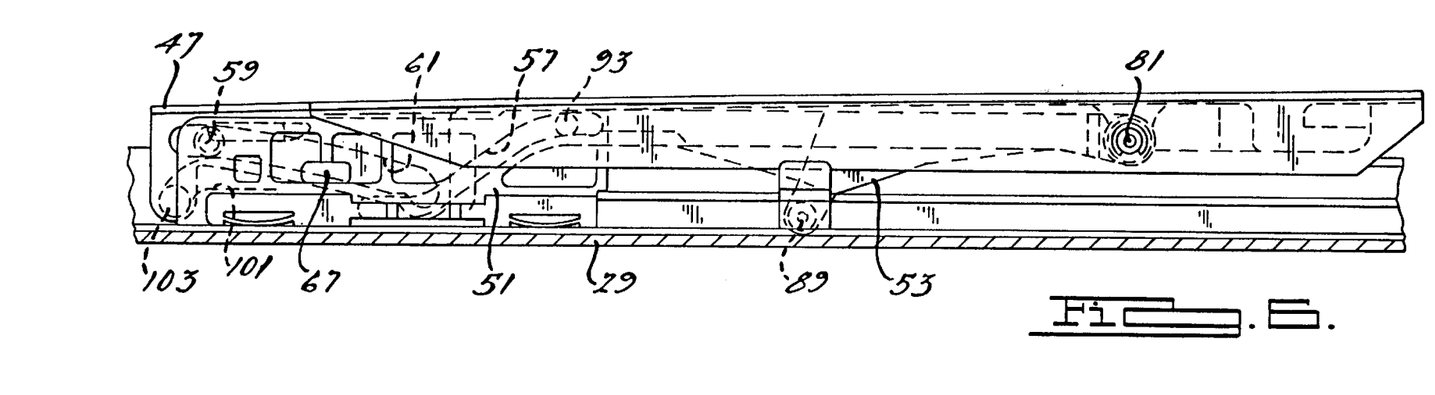
FIG. 11 is a diagrammatic top view showing a finger of the lock assembly and a cam block employed in the preferred embodiment spoiler sunroof, disposed in the fully closed and locked position.
Figure 14:
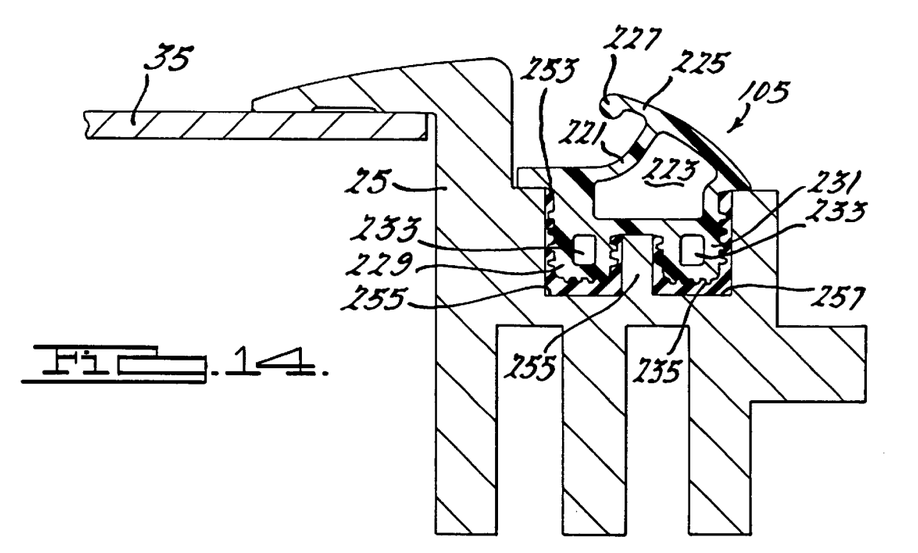
FIG. 14 is a cross sectional view, taken along line 11—11 of FIG. 1, showing a seal and housing of the preferred embodiment spoiler sunroof.

The operation of spoiler sunroof 21 of the present invention will now be explained in greater detail. FIGS. 4, 5 and 11 illustrate the spoiler sunroof and all of its mechanisms in a fully closed position covering a sunroof opening. The left side of these figures would be forward in the automotive vehicle. In this fully closed orientation, main pivot 103 of reinforcement 47 is in the lowest and forward most possible position relative to camming slot 101 of track 29. Furthermore, block pin 59 is disposed in a forward most and uppermost possible position relative to camming surface 61 of reinforcement 47. It is noteworthy that these slotted camming surfaces 61 and 101 allow for additional adjusted movement of reinforcement 47 and the sunroof panel relative to seal 105 (see FIG. 14) if the seal does not continue to fully flex to its original position after many years of use. Thus, complete panel-to-seal compression is assured. Furthermore, cam block 51 is located in its forward most advanced position when the spoiler sunroof is fully closed. This causes camming pin 93 to be in its uppermost raised orientation relative to camming surface 57. Lifting pivot 81 is thereby rotated about fulcrum pin 89 to its lowest possible position.

In this fully closed position, finger 127 of the lock assembly will engage depressed aperture 67 of cam block 51. Extension spring 133 is extended in this position and unable to pull head 123 or finger 127 since finger 127 is laterally wedged between an inwardly extending tab 201 of housing 25 and cam block 51. Hook 125 engages a lateral arm 203 (see FIG. 1) of catch 45 (also see FIG. 1), when the lock assembly is in its forward most position. Therefore, hook 125 serves to secure a rear section of the sunroof panel in its desired closed position, despite pressure changes within the vehicle passenger compartment due to passenger door closing, or when the panel would otherwise move due to rough road driving.

Figure 6:
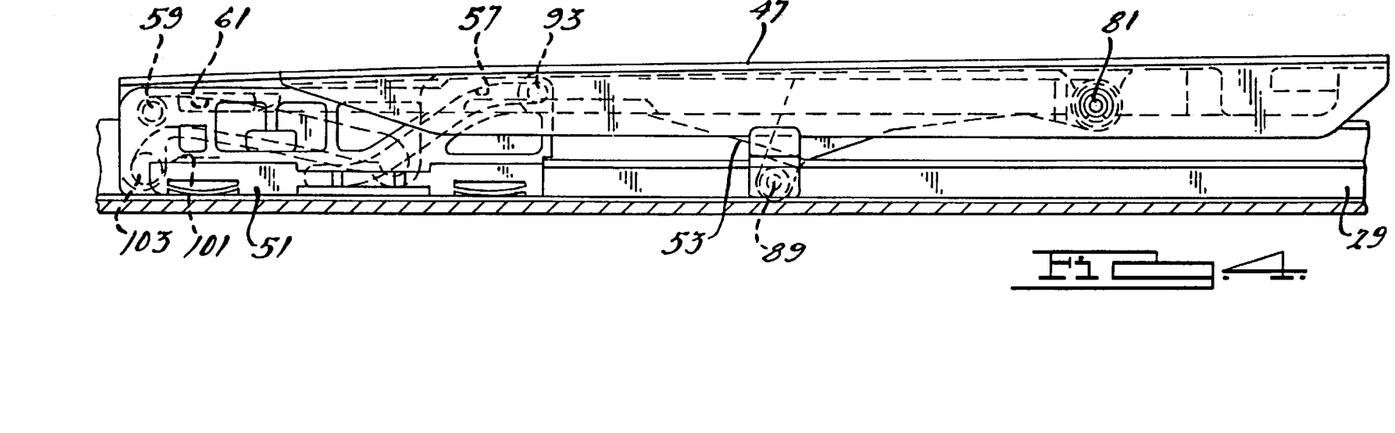
FIG. 6 is a side elevational view showing the preferred embodiment spoiler sunroof disposed in a closed but unlocked position.
Figure 12:
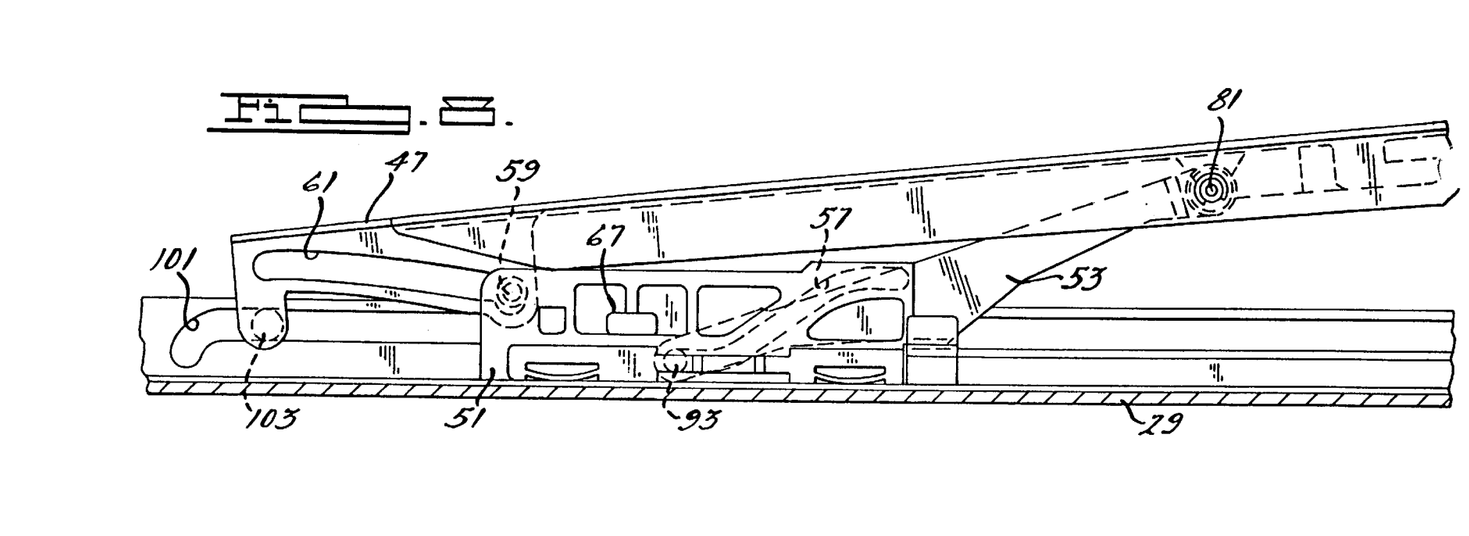
FIG. 12 is a diagrammatic top view showing the finger and cam block employed in the preferred embodiment spoiler sunroof, disposed in an intermediate locked position.
Figure 13:
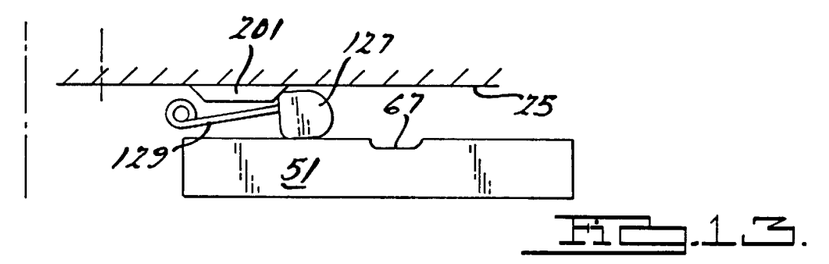
FIG. 13 is a diagrammatic top view showing the finger and cam block employed in the preferred embodiment spoiler sunroof, disposed in an intermediate unlocked and venting position.

Hook 125 is disengaged from catch 45 (see FIG. 1) when cam block 51 is moved from the fully advanced position shown in FIGS. 4, 5 and 11 to the unlocked position shown in FIGS. 6, 7 and 13. FIG. 12 shows an intermediate position wherein finger 127 of the lock assembly is rearwardly retracted in concert with cam block 51. In the unlocked state of FIGS. 6, 7 and 13, reinforcement 47 and lever 53 remain unchanged relative to track 29. However, cam block 51 has been slightly moved in a linearly rearward direction. This causes finger 127 to flex out of depressed aperture 67 in a crosscar direction once clear of tab 201. Rearward movement of finger 127 causes a simultaneous rearward disengagement of hook 125 from catch 45 (see FIG. 1). This allows subsequent tilting movement of the sunroof panel.

Figure 8:
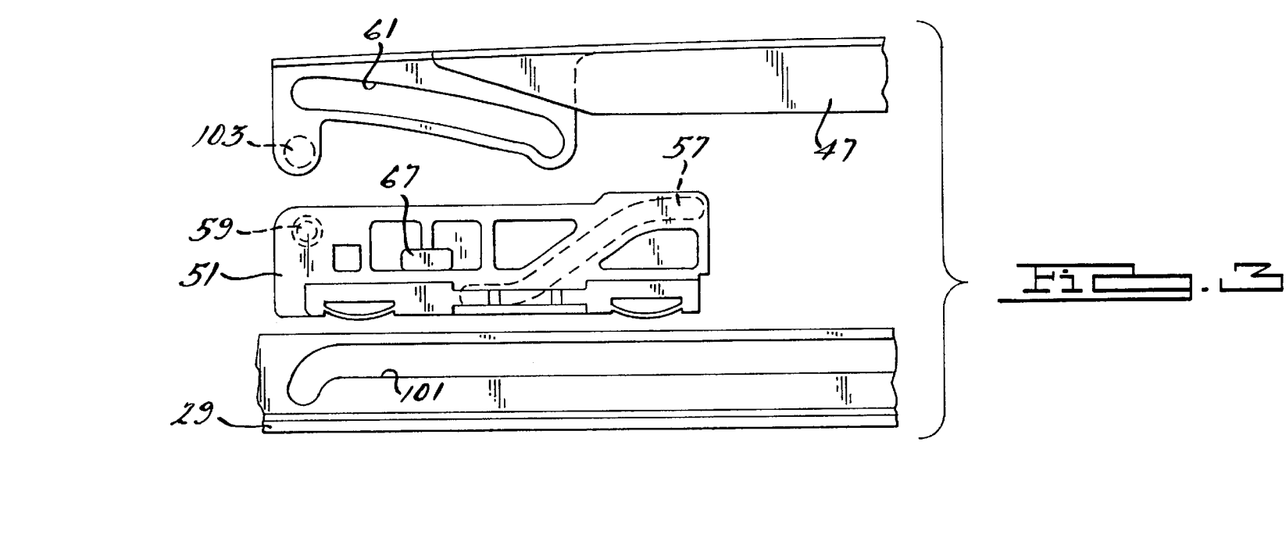
FIG. 8 is a side elevational view showing the preferred embodiment spoiler sunroof disposed in a venting and partially open position.

Further energization of the electric motor causes rearward retraction of cam block 51. First, main pivot 103 of reinforcement 47 is upwardly cammed along camming slot 101. This causes vertical decompression of seal 105 (see FIG. 14). At the same time, camming pin 93 is caused to begin riding down camming surface 57 of cam block 51, thereby upwardly tilting the rear section of reinforcement 47 and the sunroof panel. In the fully tilted venting position, as shown in FIG. 8, block pin 59 abuts against a rearmost edge of camming surface 61 of reinforcement 47. Also, camming pin 93 of lever 53 abuts against a forward most edge of camming surface 57 of cam block 51. Second, further rearward movement of cam block 51 causes the sunroof assembly to linearly move in a fore and aft manner in the spoiler-like tilted orientation until it is fully open. In the fully open position (not shown), the rear section of reinforcement 47 and the sunroof panel will be upwardly tilted and overlap the rear section of housing 25 and the adjacent stationary roof. The preceding motions are reversed to close the sunroof. Various hall effect sensors and microprocessor control units may be employed in the electrical circuit associated with energization of the electric motor, in order to define preset venting or other positions. A sliding sunshade unit can also be used to selectively cover the lower surface of the sunroof panel.

FIG. 13 shows a typical section of the preferred embodiment seal 105. Seal 105 has a hollow bulbous section 221 with a compressible internal air pocket 223. A finger 225 with a free-standing edge 227 outwardly and upwardly extends from bulbous section 221. A pair of hollow legs 229 and 231 downwardly project from bulbous section 221, in a spaced apart yet parallel manner. An air pocket 233 is disposed within each leg 229 and 231. A series of projections 235 extend around the complete periphery of legs 229 and 231. Once installed, legs 229 and 231 are separated by an upstanding wall 251 of housing 25. A primer and adhesive 253 are disposed in housing pockets 255 and 257 which receive legs 229 and 231, respectively. Seal 105 is extruded from a silicone rubber having an approximately 70 durometer. Two air access holes (not shown) are disposed through an interior upper edge of bulbous section 221 to allow for seal compression. Finger 225, the adjacent portion of bulbous section 221 and the adjacent vertical side wall of housing 25 optimally serve as a water carrying channel. Furthermore, the vertical compression of bulbous section 221 optimizes panel-to-housing sealing far better than the traditional horizontally extending weatherstrip projecting from a horizontal housing flange.

While the preferred embodiment of the spoiler sunroof has been disclosed, it will be appreciated that various other embodiments may fall within the scope of the present invention. For example, various aspects of the disclosed invention, such as the lock assembly and seal, may be employed for non-spoiler type sunroofs. Furthermore, other camming shapes and motions can be employed. Additionally, a metal sunroof panel can be readily substituted for the preferred glass panel. While various materials, shapes and sizes have been disclosed, other materials, shapes and sizes may be employed. It is intended by the following claims to cover these and any other departures from the disclosed embodiments which fall within the true spirit of this invention.

What is claimed is:

1. A spoiler sunroof for use in an automotive vehicle, the sunroof comprising:

a longitudinally elongated track;

a cam block movably attached to the track, the cam block having a first camming surface and a block interface;

a lever having a camming segment interfacing with the first camming surface of the block, the lever further having a fulcrum movably coupled to the track, the fulcrum being substantially prevented from vertically moving relative to the track, the lever also having a lift segment, the fulcrum being located substantially between and offset from the camming segment and the lift segment; and a sunroof panel reinforcement having a main pivot and a second camming surface, the main pivot being located adjacent a forward section of the reinforcement and being engagable with a portion of the track, the block interface movably engaging the second camming surface of the reinforcement;

the lifting segment of the lever being coupled to a rear section of the reinforcement.

2. The sunroof of claim 1 wherein the track includes a substantially L-shaped camming slot, the main pivot of the reinforcement riding in the substantially L-shaped camming slot.

3. The sunroof of claim 1 further comprising an actuating cable mounted to the cam block.

4. The sunroof of claim 1 further comprising an abutment structure projecting in a crosscar manner and moving with the reinforcement, the abutment structure being vertically movable through a slot in the track when the reinforcement is moved from a closed position to a venting position, the abutment structure being movable in a fore and aft direction directly above a wall of the track when the reinforcement is moved in the fore and aft direction thereby deterring inadvertent collapsing of the reinforcement toward the track when the abutment structure is rearward of the slot of the track.

5. A spoiler sunroof comprising:

a sunroof panel assembly movable from a substantially horizontal closed position to an open position at least partially above a plane of the closed position;

an elongated track having a wall with a slot;

a lifting mechanism movably coupling the panel assembly to the track;

a pin operably moving through the slot of the track when the lifting mechanism raises the panel assembly;

the pin operably moving in a fore and aft direction above the wall of the track when the lifting mechanism moves the panel assembly from the closed position to the open position;

the pin being operable to prevent undesired collapsing of the panel assembly toward the track by contacting against the wall of the track when not aligned with the slot;

a front pivot coupling the panel to the track, the front pivot being moveable within the track past the slot;

a cam coupled to the track and having a camming surface, the cam being movable in the fore and aft direction relative to the track; and a lever having a lifting pivot, a camming pin and a fulcrum, the lifting pivot being operable to lift the panel assembly, the camming pin being movably driven by the camming surface, and the fulcrum being movably coupled to the track;

a lock assembly movably coupled to the track, the lock assembly including a panel securing member and a finger; and a biasing member operably biasing the lock assembly in a first direction along a fore and aft axis relative to the track.

6. The sunroof of claim 5 wherein the pin projects from the panel assembly.

7. The sunroof of claim 5, wherein the wall of the track has a substantially horizontal upper flange, the slot is located in the flange for allowing vertical passage of the pin when the panel assembly is tilted.

* * * * *

UNITED STATES PATENT AND TRADEMARK OFFICE
CERTIFICATE OF CORRECTION

PATENT NO. : 6,454,347 B2
DATED : September 24, 2002
INVENTOR(S) : Kiman Lee et al.

It is certified that error appears in the above-identified patent and that said Letters Patent is hereby corrected as shown below:

Title page,
Item [56], References Cited, U.S. PATENT DOCUMENTS,
"4,630,860 A 12/1986 Euerst" should be -- 4,630,860 A 12/1986 Fuerst et al. --; and
"4,974,902 A 12/1990 Huyer" should be -- 4,974,902 A 12/1990 Huiyer --.
FOREIGN PATENT DOCUMENTS,
"RU 66875 2/1940" should be -- 66875 2/1940 Czech Republic --.
OTHER PUBLICATIONS,
Insert -- ASC Incorporated Drawing for Part No. C-49X5-0001-AXXX dated Mar. 24, 1995 and entitled Housing Assembly - Complete (750) (believed to have been offered for sale or publicly used prior to June 4, 1999). --.

Column 3,
Lines 23-24, insert -- Referring to Figures 1-3, the preferred embodiment of a spoiler sunroof 21 of the present invention includes a sunroof panel assembly 23, a metal housing 25, a panel lifting and actuating mechanism 27, a stationary track 29, a lock assembly 31, and a metal reinforcing pan 33. Housing 25 and reinforcing pan 33 serve to secure a pair of tracks 29 and the associated mechanisms to a stationary fixed roof 35 (see Figure 14) of an automotive vehicle. --.

Column 4,
Line 7, "Nylon 616" should be -- Nylon 6/6 --.
Line 10, after "103" insert -- is --.
Line 38, "springs top" should be -- spring stop --.
Line 67, "forward most" should be -- forwardmost --.

Column 5,
Lines 2, 10, 23 and 53, "forward most" should be -- forwardmost --.

Signed and Sealed this

Third Day of June, 2003

JAMES E. ROGAN
*Director of the United States Patent and Trademark Office*